April 12, 1966

D. W. ENOCH ETAL 3,245,361

CAKE BATTER PRODUCTION

Filed Nov. 13, 1962

INVENTORS.
Duard W. Enoch
Joseph J. Bogner
By Darbo, Robertson & Vandenburgh
Attys.

April 12, 1966  D. W. ENOCH ETAL  3,245,361
CAKE BATTER PRODUCTION

Filed Nov. 13, 1962  2 Sheets-Sheet 2

INVENTORS.
Durand W. Enoch
Joseph J. Bogner
By Darbo, Robertson &
Vandenburgh Attys.

United States Patent Office 3,245,361
Patented Apr. 12, 1966

3,245,361
CAKE BATTER PRODUCTION
Duard W. Enoch, Kansas City, Mo., and Joseph F. Bogner, Shawnee Mission, Kans., assignors to Interstate Bakeries Corporation, Kansas City, Mo., a corporation of Delaware
Filed Nov. 13, 1962, Ser. No. 237,096
14 Claims. (Cl. 107—54)

The present invention relates to a method and apparatus for use in the production of bakery products, and the following is a disclosure offered for public dissemination upon the grant of a patent therefor.

In the production of some bakery products, it has been known that advantages could be achieved by mixing the ingredient under superatmospheric air pressure. Among other things, this facilitates the incorporation of air into the mix, thus reducing the mixing time.

For example, in the manufacture of cakes, the desirable characteristics of the finished cake depends in a large measure upon the production of a froth, that is, a mix having a large quantitiy of air incorporated therein in the form of small air bubbles separated and held by the ingredients of the mix.

While it has been known that pressurized mixing was advantageous and an apparatus has been available for performing the operation, it has not been generally adopted as a part of commercial baking practices. The principal reason for this is that there has been no practical way to transfer the finished mix from the pressurized zone in which it was prepared to the open baking pan without destroying the character of the mix. As the pressure is relieved from the mix (by going from the pressurized mixing zone to atmospheric pressure) the air bubbles expand breaking the cellular walls of the foam in which the air is trapped. The small air bubbles combine to form large air bubbles which either are lost by further rupture of the cell walls or remain trapped as large air bubbles. The emulsion is ruined and the batter loses stability. There is a severe weakening of the batter structure. The resulting cake is weak ad flattens out. The net result is a mix which does not have the necessary characteristics for producing a satisfactory cake.

Heretofore no satisfactory method or apparatus has been devised for overcoming this problem. The principal object of the present invention is to provide a method and apparatus for preparing a mix for a bakery product under superatmospheric air pressure and for transferring that mix to pans at atmospheric pressure without destroying the desirable characteristics of the mix.

Further objects and advantages will become apparent from the following description taken in conjunction with the drawings in which.

Although the following disclosure offered for public dissemination is detailed to ensure adequacy and aid understanding, this is not intended to prejudice that purpose of a patent which is to cover new inventive concepts therein no matter how others may later disguise it by variations in form or additions or further improvements. The claims at the end hereof are intended as the chief aid toward this purpose; as it is these that meet the requirement of pointing out the parts, improvements, or combination in which the inventive concepts are found.

Figure 1:
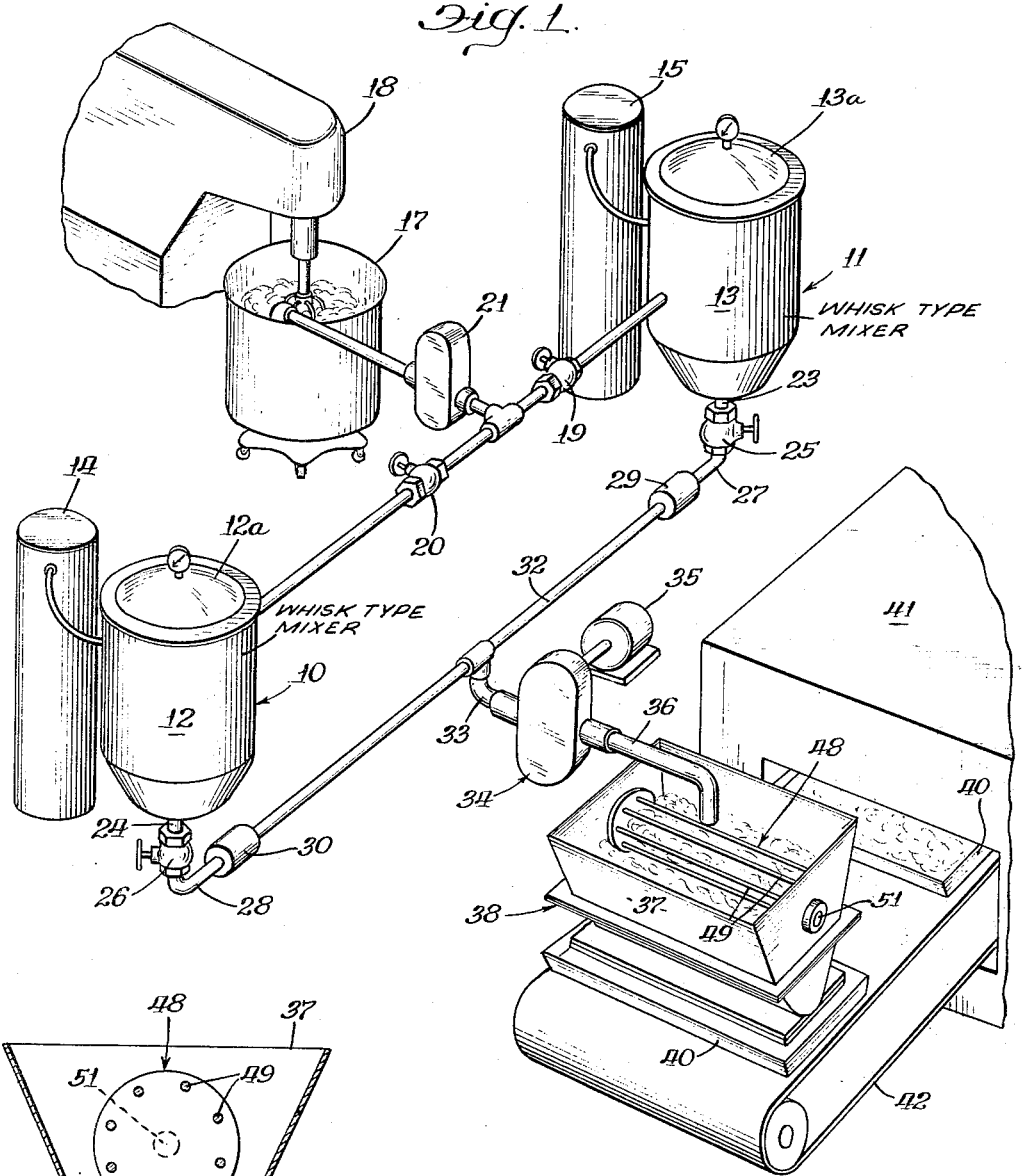
FIGURE 1 is a perspective view, in somewhat diagrammatic form, of an embodiment of our invention.

Referring to FIGURE 1, there are a pair of mixing devices generally 10 and 11 employed for mixing a cake batter under pressure. The mixing devices include containers 12 and 13, respectively, defining closed chambers in which the mixing is performed. The containers have covers 12a and 13a respectively which may be opened and hermetically sealed when closed. Means such as air tanks 14 and 15 are connected to containers 12 and 13 to pressurize the mixing chambers respectively. Mixing devices 10 and 11 are not illustrated and described in detail since they are known to the prior art. For example, they could be a whisk of the type illustrated and described in U.S. Patent No. 1,801,101, particularly FIGURES 1 and 2. A whisk of this general type is ideally suited for cake batter production. The type illustrated in FIGURE 6 of that patent would be suitable for mixing doughs under pressure.

In the use of a plurality of mixing devices we recommend the premixing of the ingredients for the cakes. In the illustrated embodiment the ingredients are inserted into a bowl 17 in which they are premixed by a mixer 18. After the premixing, the ingredients are transferred from bowl 17 to either one or the other of mixing devices 10 and 11. This is performed by the opening of one of valves 19 and 20. Means such as pump 21 then are operated to withdraw the premix from bowl 17 and inject it into the appropriate mixing device.

The chambers of the mixing devices have discharge openings, which are represented by discharge pipes 23 and 24 in the illustrated embodiment. Valves 25 and 26 control the flow through the discharge openings of the mixing chambers. Pipes 27 and 28 connect valves 25 and 26 with sensing devices 29 and 30, respectively.

The two sensing devices 29 and 30 are connected by a pipe 32 having a branch 33 leading to the intake of a positive displacement rotary pump generally 34. Pump 34 has a power means represented by motor 35. The discharge of pump 34 is through a pipe 36 leading to the hopper 37 of a depositor generally 38. Depositor 38 inserts measured quantities of batter into cake pans 40. The filled cake pans 40 are carried through a baking oven 41 by an endless conveyor 42.

Depositor 38 is of a swing vane type. It includes a vane 43 which is slidably mounted in a rotatable cylinder 44. The mix is discharged through a spout 45, closed by a pivotable cover 46.

Figure 2:
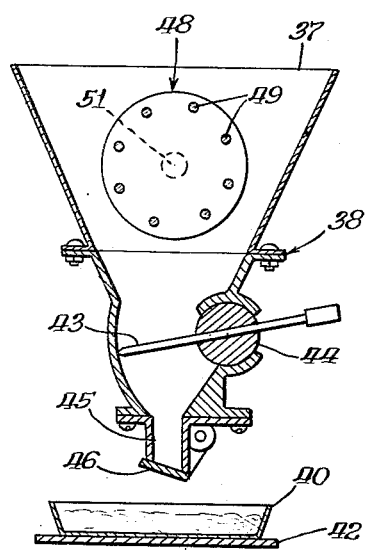
FIGURE 2 is a sectional elevation of the depositor employed for filling the baking pans.

To fill a pan 40, starting at the position illustrated in FIGURE 2, cover 46 would be opened and cylinder 44 rotated in a counterclockwise direction. Vane 43 gently pushes the measured quantity of batter out of spout 45 into the pan. At the completion of the filling, cover 46 again is closed over spout 45 and vane 43 is moved to the right to an extent such that its left edge is approximately coincident with the periphery of cylinder 44. Batter now can flow down from the hopper to fill the space above cover 46.

Cylinder 44 then is rotated in a clockwise direction. The extent of this latter rotation determines how much batter is to be deposited in the pan 40. At the finish of the rotation of cylinder 44, vane 43 is moved to the left to the position illustrated in FIGURE 2. The apparatus then is set for the filling of another pan when it has been moved under spout 45 by conveyor 42. As so far described, the depositor is known in the art.

In the use of a depositor in connection with our invention we have found that it is important that the cake batter be gently stirred in hopper 37. The stirring is accomplished effectively by a cylindrical cage generally 48 mounted in hopper 37. The cage 48 is mounted for rotation about its cylindrical axis which is approximately horizontal and running the length of the hopper. The cage 48 comprises a plurality of wires or rods 49 secured to end members 50. In turn end members 50 are attached to shafts 51 suitably journalled in hopper 37. One of shafts 51 is connected to a power means, not shown, to slowly rotate the cage.

In the operation of the apparatus of FIGURE 1, the ingredients are mixed in bowl 17. The ingredients thus premixed are transferred to one or the other of mixing devices 10 and 11. For the purposes of illustration, it will be assumed that the premixed ingredients are transferred to mixing device 10. This is done by closing valve 19, opening 20 and operating pump 21. Similarly, mixer 11 is filled by operating pump 21 when valve 20 is closed and valve 19 is open. With valve 26 closed, the filled mixing device 10 is pressurized from tank 14 and the mixing operation carried out for a period of time sufficient to produce the desired batter consistency. While this is going on, a second batch of ingredients will be premixed in bowl 17 for transfer to mixing device 11.

Upon the completion of the mixing in device 10, valve 26 is opened. The superatmospheric air pressure within mixing device 10, forces the batter through valve 26, pipe 28, sensing device 30, pipe 32 and branch 33 to pump 34. At pump 34 small quantities of the mix are sequentially separated from the main stream thereof and moved to discharge pipe 36. This continues until all of the batter is withdrawn from mixing device 10, a condition that will be determined by sensing device 30 (as hereinafter described). At the discharge of pump 34, there will be a slight back pressure due to limited frictional resistance in pipe 36. The term "approximately atmospheric" is used herein with reference to the discharge pressure at the pump (at which point the small individual quantities transferred through the pump are recombined) to take into account the relatively nominal back pressure that may exist for this reason.

When it is determined that mixing device 10 is empty, valve 26 is closed and valve 25 is opened. The period of time required to remove the batter from mixing device 10 normally is fully adequate to permit the completion of a batter in mixing device 11. Again the superatmospheric air pressure in mixing device 11 forces the batter therein out through pipe 23, valve 25, pipe 27, sensing device 29, pipe 32 and branch 33 to pump 34. While this is going on, another premix will have been transferred to mixing device 10, pressurized and mixed to a cake batter. The batter continuously delivered to hopper 37 will be gently stirred therein and deposited in cake pans 40 for baking in oven 41.

We have found that the process of separating a small quantity of the mix or batter from the main body thereof-withdrawing that small quantity to approximately atmospheric pressure, releasing it and then recombining it with other small quantities similarly withdrawn prevents the deleterious effects normally encountered with the removal of pressure from the pressurized mix. By small quantity we mean a portion which is not in excess of six cubic inches. This step of the process effectively is carried out by one of the pieces of equipment within the general classification known as positive displacement rotary pumps. Various types of these pumps are well known and can be used, as for example a gear pump (or one of the numerous modifications thereof), a rotary sliding vane pump, etc.

While this apparatus is of a type normally referred to as a "pump" (and is so referred to in here for identification purposes), it is important to note that we do not use it as such in the present invention. As an apparatus of the type normally referred to as a pump is employed, the pressure at the intake thereof is relatively low as compared to the pressure at the discharge side thereof, or, to put it another way, the apparatus is employed to impart energy to the fluid being pumped. In the use of the apparatus in the present invention this is not the case, but just the reverse is true. The intake pressure of the pump 34 of the described embodiment is relatively high as compared to the discharge pressure at pipe 36. Motor 35 operates pump 34 at a speed wherein the transfer of material through the pump is at a rate slower than the rate at which the material would be delivered to the pump by the super-atmospheric pressure existing in mixers 10 and 11. Thus, while the apparatus is of a type normally termed a pump, the process which it is performing in the present invention is different than the usual pumping operation.

Features of our invention may be used advantageously in other mixing devices wherein the same or a similar problem is involved. For example, a mixer of the type illustrated in U.S. Patent No. 2,572,049 sometimes is employed for mixing under pressure. In such instances it generally has been recognized that the material cannot be discharged directly to atmosphere from the pressurized mixing device. Discharge of the material through a valve has not proven to be a solution. The batter characteristics will change (even within a single batch) when that batch is released through a conventional valve). The valve cannot be properly controlled. Users of apparatus of the type of the above patent have been told to discharge the material through a long hose or pipe which will have sufficient frictional resistance because of its diameter and length to result in a slow pressure drop of the material between the pressurized mixing zone and atmosphere.

While such a procedure does help alleviate the problem, it is not fully satisfactory. For example, the length of the pipe must be proportioned to the required pressure in the mixing zone. While the baker desires to regulate his operations on the basis of volume, he is forced to discard volume control by reason of the necessity of maintaining pressure control. If the pressure is changed substantially, it is necessary to change the length of the pipe or hose (to change the total frictional resistance thereof). Other disadvantages include: the space necessarily occupied by the length of pipe or hose; the problem of cleaning the length of pipe or hose; etc. These disadvantages are discussed in further detail in U.S. Patent No. 2,679,866 which relates to an allegedly improved device for meeting this problem, but which still incorporates an extended, small diameter, conduit for achieving a slow pressure drop. The process heretofore described herein of removing small quantities and then recombining them (as by means of a positive displacement rotary pump, operated at a nonpumping speed) is a solution.

Figure 3:
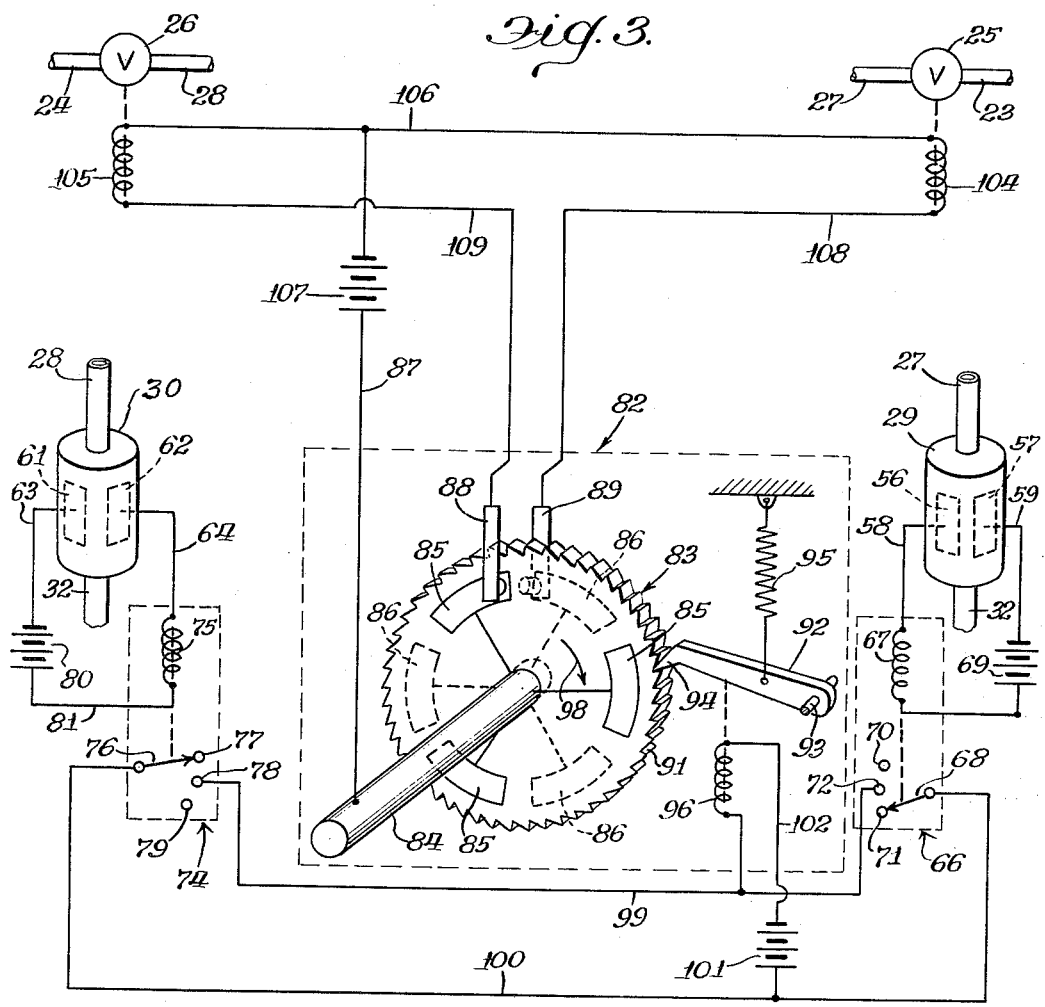
FIGURE 3 is a schematic diagram of an electrical control device employed in connection with FIGURE 1.
Figure 4:
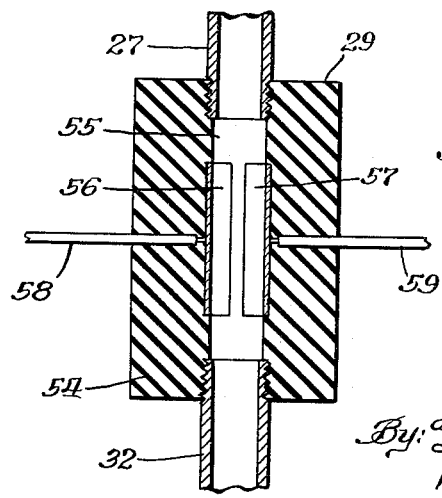
FIGURE 4 is a section through one of the sensing devices employed in the electrical control device.

FIGURE 3 illustrates a form of electrical control means that can be employed to perform the previously described cycling of the discharge of mixing devices 10 and 11. Sensing device 29 comprises body 54 formed of an electrical insulating material and having a passageway 55 therethrough. Pipes 27 and 32 are secured to body 54 in communication with passageway 55. A pair of metal plates 56 and 57 are mounted in passageway 55. The plates 56 and 57 are spaced from each other on opposite sides of the passageway. Wires 58 and 59 are connected to plates 56 and 57 respectively. Sensing device 30 is similarly constructed and has a pair of metal plates 61 and 62 in the internal passageway and connected to wires 63 and 64 respectively.

A relay generally 66 has an operating coil 67 and a switch arm 68 actuated thereby. Coil 67 is connected in series with a suitable source of power, as illustrated by battery 69, and plates 56 and 57. When coil 67 is energized, switch arm 68 assumes the position illustrated by contact 70. When the coil is deenergized, switch arm 68 assumes the position illustrated by contact 71. In moving between the energized and deenergized positions, arm 68 will close an electrical circuit through contact 72.

A similar relay generally 74 is connected to sensing device 30. Relay 74 includes a coil 75, a switch arm 76 and three contacts 77–79. Contact 77 is the energized contact while contact 79 is the deenergized contact.

Coil 75 is connected in series with battery 80 and sensing plates 61 and 62 by means of wires 63, 64 and 81.

A stepping relay generally 82 has a wheel 83 secured to a rotatably mounted shaft 84. Wheel 83 has a series of commutator segments on one side of the wheel and a second series of segments 86 on the opposite side. Each of segments 85 and 86 are electrically connected to shaft 84 which in turn is electrically connected to wire 87. A brush 88 is mounted to contact segments 85 and a brush 89 is mounted to contact segments 86.

The periphery of wheel 83 has teeth 91 thereabout. Teeth 91 are engaged by a ratchet defined by lever 92. Lever 92 is pivoted at 93 and has a ratchet dog 94 at the other end which engages teeth 91. A spring 95 urges lever 92 upwardly. A coil 96, when energized, moves lever 92 downwardly to rotate wheel 83. On the upward movement of lever 92 wheel 83 remains stationary.

The shape and positioning of segments 85 and 86 is so positioned in relation to the amount of movement given to the wheel upon each actuation of lever 92 that upon each third actuation of lever 92, a different one of the brushes (88 or 89) comes into contact with a different segment. In other words, starting with the position illustrated in FIGURE 3, the next actuation of lever 92 would turn wheel 83 in the direction of rotation 98 so that brush 89 now would be in contact with the first half of the next commutator segment 86. Upon the next succeeding actuation of lever 92, wheel 83 would be turned in the same direction a similar amount. However, at that time, brush 89 still would remain in contact with the same commutator segment 86 (the last half thereof). Upon the third actuation of lever 92, brush 89 would leave segment 86 and brush 88 would come into contact with the next segment 85 (the first half thereof).

Contacts 72 and 78 of relays 66 and 74 are connected together and to coil 96 by a wire 99. Switch arms 68 and 76 of the same two relays are connected together by a wire 100 which also goes to a suitable source electrical power, as represented by battery 101. A wire 102 connects battery 101 with coil 96.

Valves 25 and 26 are electrically operated by solenoids 104 and 105 respectively. The valves are normally closed and are opened when the respective solenoid is energized. A wire 106 connects one side of the two solenoids to a suitable source of power, as represented by battery 107. A wire 108 connects solenoid 104 to brush 89 and a wire 109 connects solenoid 105 to brush 88.

The wiring diagram of FIGURE 3 illustrates the position of the parts at the time that valve 26 is open with the batter from mixing device 10 being delivered to pump 34. The batter which is flowing through the passageway of sensing device 30 forms an electrical connection between plates 61 and 62 of the sensing device. This completion of the electrical circuit through the coil of relay 74 causes the switch arm thereof to be on contact 77. Relay 66 is deenergized since no batter is flowing through sensing device 29.

When the batter from mixer 10 is discharged to an extent such that it no longer forms an electrical circuit between the two plates 61 and 62, the current flow through coil 75 of relay 74 is disrupted. As a result, switch arm 76 of the relay drops out. In passing contact 78, switch arm 76 completes an electrical circuit through coil 96 of stepping relay 82. The energizing of coil 96 pulls lever 92 down, moving wheel 83 one step in the direction indicated by arrow 98. Upon the first step of rotation of wheel 83, commutator segment 85 moves away from brush 88 and breaks the circuit through solenoid 105 of valve 26. Thus, valve 26 is closed and mixing device 10 is ready to be refilled.

The same one-step movement of wheel 83 brings the next commutator segment 86 into contact with brush 89. This completes a circuit through solenoid 104 of valve 25 as follows: wire 87, shaft 84, commutator segment 86, brush 89, wire 108, solenoid 104 and wire 106 to battery 107. Valve 25 opens and the air pressure within mixing device 11 commences moving the batter out through the valve.

As soon as the batter passes between plates 56 and 57 of sensing device 29, a circuit is closed through coil 67 of relay 66. This energizes the coil and moves switch arm 68 upwardly toward contact 70. During the course of this movement switch arm 68 completes a circuit through contact 72 and energizes coil 96 of the stepping relay. Again lever 92 is pulled downwardly moving wheel 83 a second step in the direction indicated by arrow 98. Of course, as soon as arm 68 leaves contact 72 and moves to contact 70 the circuit through coil 96 is broken and arm 92 is returned up under the urging of spring 95. The second step of movement of wheel 83 merely moves the wheel to an extent such that brush 89 is then on the second half of the same commutator segment 86.

When mixing device 11 drains to an extent such that there is no longer any batter between plates 56 and 57 of sensing device 29, coil 67 of relay 66 is deenergized and switch arm 68 returns to the position illustrated in FIGURE 3. During this downward movement, switch arm 68 again completes a circuit through contact 72 to energize coil 96 of the stepping relay. This results in a third actuation of wheel 83. At the end of that actuation, brush 89 no longer is in contact with one of segments 86. However, brush 88 now bears against one of commutator segments 85 (against a portion of the first half of the segment). Valve 104 is closed by the breaking of the circuit through brush 89. Valve 105 is opened by a new circuit through brush 88 and the segment 85 which it now contacts.

Again batter leaves mixing device 10. Upon the batter reaching sensing device 30, a circuit is completed through the coil 75 of relay 74 with the switch arm 76 thereof being picked up to the position illustrated in FIGURE 3. Upon passing contact 78, switch arm 76 completes a circuit through coil 96 of the stepping relay and that relay is advanced a fourth step, with brush 88 then being on the second half of the same commutator segment 85. At this point, all of the parts have returned to the position illustrated in FIGURE 3.

Various modifications will be apparent to those skilled in the art from the foregoing description. For example, with reference to the schematic diagram of FIGURE 3 batteries have been illustrated as providing a source of energy for the various coils and solenoids. In actual practice, one skilled in the art normally would employ another source of electrical power as substitute for the battery.

In this embodiment, the sensing devices operate on the principle of passing an electric current between the sensing plates to determine on the basis of conductivity whether or not batter is present. Alternatives therefor will be apparent to those skilled in the art. As an alternative the dielectric between plates 56 and 57 for example, could be measured and used to operate relay 66. The dielectric would change depending upon whether or not batter or air existed between the two plates. An electric eye and beam of light might be employed as sensing devices to operate relays 66 and 74.

In some embodiments, in which particularly high pressures were used, the user might employ two valves connected in parallel and positioned at opposite sides of the sensing device to isolate the sensing device from the other part of the system. As for example, another valve would be put in pipe 32 between sensing device 30 and branch 33. The solenoid of that additional valve would be connected in parallel with solenoid 105 of valve 26 so that the two would operate in unison. A similar valve would be put in pipe 32 between sensing device 29 and branch 33 with that valve being electrically connected in parallel with valve 25 for operational purposes.

While a pump 21 is shown to be employed to transfer the premix from bowl 17 to the two mixing devices 10 and 11, a substitute therefor would be to cover bowl 17. Fluid pressure then would be applied within the covered bowl to force the premix from the bowl into the mixing devices. Of course, the premix could be moved by hand from bowl 17 to the mixer.

In the diagrammatic illustration of FIGURE 1, there is a substantial separation between the valves and the respective mixing device, e.g. 25 and 11, and between the mixing devices 10 and 11 and pump 34. In actual practice, all of these should be as closely coupled as is practical.

The following is a specific example of the manufacture of white layer cake by the described method and apparatus. Into bowl 17 is put 77 pounds of granulated sugar, 55 pounds of cake flour, 5½ pounds of dry milk powder, 30 pounds of cake shortening, 2 pounds baking powder and 2 pounds of salt. These are mixed smooth at a slow speed by mixer 18. Thereafter 30 pounds of water is added and all are mixed to a smooth consistency. Forty pounds of fresh egg whites and 1¼ pounds of vanilla then are added. The sides of bowl 17 are scraped down and the premix is mixed to a smooth consistency. Then 22 pounds of water are added and the material is mixed to a smooth slurry.

The slurry then is transferred from bowl 17 to one of the whisks, e.g. mixing device 10. Container 12 of the whisk is pressurized to 20 pounds per square inch above atmospheric pressure. The whisk then is operated at high speed, e.g. 280 r.p.m., for 3 minutes. At the end of the 3 minute mixing time, the batter thus produced is ready to be transferred to pump 34 for reduction in pressure to atmospheric and delivery to hopper 37 of the depositer. Of course, as will be apparent from the previous description a similar premix was formed in bowl 17 and transferred to whisk 11, alternatively with the filling of whisk 10.

One advantage of our invention will be particularly appreciated by bakery operators and their employers. This is that the system may be shut down for reasonable periods of time at any stage of its operation without deleteriously affecting the character of the products being produced. For example, assume that the mixing device that was being emptied, e.g. 10, was only half empty at the noon hour when the operators are to go to lunch. Motor 35 is deenergized, stopping pump 34. The pump, when stopped, serves as a shut-off valve so that the remaining contents of mixer 10 remain trapped between the pump and the mixer. They are retained there under pressure and there is no change in the character of the batter. Depositer 38 is operated until it is empty, which will not take long. Depending upon the capacity of hopper 37 and the pan size, this would only be for a few pans. Upon a restarting at the end of the noon hour, motor 35 is energized and sufficient batter inserted in hopper 37. Thereafter depositer 38 is restarted and full operation can be continued from that point in the cycle.

We claim:

1. In the process of making a bakery product wherein a mix is prepared under superatmospheric pressure in a mixing zone and thereafter transferred to pans for baking at atmospheric pressure, the improvement in transferring the mix from said zone to said pans including the steps of: withdrawing the mix from said zone and sequentially separating small quantities of mix from the superatmospheric pressurized mix from the zone; after each quantity is so separated reducing the pressure thereon approximately to atmospheric; and after each quantity has been brought to approximately atmospheric pressure recombining the quantities.

2. In the process of making cakes wherein a cake batter is prepared in a whisk having an enclosed chamber which is pressurized to a super-atmospheric presssure and the batter thereafter is transferred to open pans for baking the improvement in transferring the batter from said zone to said pans including the steps of: flowing the batter from the container in a stream while maintaining a superatmospheric pressure thereon; sequentially dividing said stream into small units of batter; reducing the pressure on each unit to approximately atmospheric pressure; and thereafter recombining the units.

3. In the process of making cakes wherein a cake batter is prepared in a mixer having an enclosed mixing zone which is pressurized to a superatmospheric pressure and the batter thereafter is transferred to the hopper of a depositor for insertion into pans for baking at atmospheric pressure, the improvement in transferring the batter from said zone to said pans including the steps of: withdrawing the batter from said zone and sequentially separating small quantities of batter from the superatmospheric pressurized mix from the zone; after each quantity is so separated reducing the pressure thereon approximately to atmospheric; and after each quantity has been brought to approximately atmospheric pressure recombining the quantities, inserting them into the hopper and gently stirring them together therein.

4. A process for use in making a bakery product comprising the steps of: mixing the ingredients for the product in a mixer under superatmospheric pressure to produce a mix; sequentially separating small quantities of the pressurized mix from the main portion thereof; reducing the pressure on each small quantity to approximately atmospheric pressure; and thereafter recombining the quantities.

5. An apparatus for use in making a bakery product, said apparatus comprising: mixing means for mixing the ingredients under superatmospheric pressure to produce a mix; and means communicating with said mixing means to sequentially separate small quantities of the pressurized mix from the main portion thereof, to reduce the pressure on each small quantity approximately to atmospheric and to thereafter recombine the quantities.

6. An apparatus as set forth in claim 5, wherein the last means includes a positive displacement rotary pump.

7. An apparatus as set forth in claim 6, wherein the last means includes a motor connected to the pump to operate the pump at a speed at which the intake pressure is relatively high and the discharge pressure is relatively low.

8. An apparatus as set forth in claim 5, wherein the mixing means is a whisk type mixer.

9. An apparatus for use in making a bakery product, said apparatus comprising: mixing means for mixing the ingredients under superatmospheric pressure to produce a mix; a depositor to insert the mix into baking pans, said depositor having a hopper to receive the mix and means in the hopper to gently stir the mix therein; and means communicating with the mixing means and with the hopper to sequentially separate small quantities of the pressurized mix from the main portion thereof, to reduce the pressure on each small quantity approximately to atmospheric and to thereafter recombine the quantities and to insert them into the hopper.

10. An apparatus as set forth in claim 9, wherein the means in the hopper includes a cage rotatable about a generally horizontal axis and power means connected to the cage to slowly rotate the cage.

11. An apparatus as set forth in claim 10, wherein said cage is generally cylindrical about an axis and the cage is mounted for rotation about the axis.

12. An apparatus for use in making a bakery product from baking ingredients, said apparatus including: two mixers, each mixer including an enclosed mixing chamber, means through which the ingredients may be inserted into the chamber, means by which the chamber may be pressurized during at least the latter part of the mixing process, and a discharge outlet; a positive displacement rotary pump having an intake and a discharge; conduit means from said outlets to said intake, said conduit means including valves to control the flow from each outlet respectively to the intake; a motor connected to said pump to operate the pump at a speed at which the pressure at the intake from communication with the pressurized chambers is higher than the pressure at the discharge; sensing means to determine when each chamber has been emptied of mix; and control means connected to said valves and to said sensing means to open one valve until the respective chamber is empty and then to close the one valve and open the other valve.

13. An apparatus as set forth in claim 12, wherein the mixers are of a whisk type.

14. An apparatus for use in making cake mix from cake ingredients, said apparatus including: two whisks, each whisk including an enclosed mixing chamber, means through which the ingredients may be inserted into the chamber, means by which the chamber may be pressurized during at least the latter part of the mixing process, and a discharge outlet; valves communicating with the discharge outlets and respectively controlling the flow of mix from each chamber; sensing means to determine when each chamber has been emptied of mix; a positive displacement rotary pump having an intake and a discharge, said intake communicating with said valves; a motor connected to said pump to operate the pump at a speed at which the pressure at the intake from communication with the pressurized chambers is higher than the pressure at the discharge; a depositor to insert the mix into baking pans, said depositor having a hopper to receive the mix and means in the hopper to gently stir the mix therein, said hopper being in communication with the discharge to receive mix therefrom; and control means connected to said valves and to said sensing means to open one valve until the respective chamber is empty and then to close the one valve and open the other valve.

References Cited by the Examiner
UNITED STATES PATENTS

| | | |
|---|---|---|
| 33,432 | 10/1861 | Fitzgerald. |
| 2,223,687 | 12/1940 | Hummel. |
| 2,880,455 | 4/1959 | Mineah _____ 259—9 X |
| 2,953,460 | 9/1960 | Baker. |
| 3,169,751 | 2/1965 | Steele _____ 259—9 X |

ROBERT E. PULFREY, *Primary Examiner.*

JOSEPH D. BEIN, *Examiner.*